(12) United States Patent
Yamada et al.

(10) Patent No.: US 6,664,493 B2
(45) Date of Patent: Dec. 16, 2003

(54) GAS-INSULATED SWITCHGEAR

(75) Inventors: Hitoshi Yamada, Hitachinaka (JP); Mamoru Okabe, Hitachi (JP); Toshihisa Miyamoto, Hitachi (JP); Isamu Ozawa, Hitachi (JP); Chikara Fujisawa, Tokai (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/246,457

(22) Filed: Sep. 19, 2002

(65) Prior Publication Data

US 2003/0111443 A1 Jun. 19, 2003

(30) Foreign Application Priority Data

Dec. 18, 2001 (JP) .......................... 2001-384401

(51) Int. Cl.[7] ............................................. H01H 33/70
(52) U.S. Cl. .............................. 218/43; 218/45; 218/80; 361/611; 307/612
(58) Field of Search ............................... 218/43, 7, 154; 361/605, 611, 612; 307/64–66, 85–87, 38–40, 29, 112, 113, 147, 149

(56) References Cited

U.S. PATENT DOCUMENTS 3,681,549 A * 8/1972 Schmitz et al. ................ 218/83
3,823,346 A * 7/1974 Olsen .......................... 361/612
4,862,319 A * 8/1989 Suzuyama et al. ........... 361/612
4,866,569 A * 9/1989 Okumura et al. ............ 307/147
5,754,382 A * 5/1998 Aoyama et al. ............... 307/85
6,399,911 B1 * 6/2002 Tsuzura et al. ................ 218/43

FOREIGN PATENT DOCUMENTS

| JP | 57-202808 | 12/1982 |
| JP | 60-141606 | 9/1985 |
| JP | 11-146522 | 5/1999 |
| JP | 2000-50436 | 2/2000 |

* cited by examiner

*Primary Examiner*—Karl D. Easthom
*Assistant Examiner*—M. Fishman
(74) *Attorney, Agent, or Firm*—Mattingly, Stanger & Malur, P.C.

(57) ABSTRACT

A gas-insulated switchgear of an 1½ CB system, in which three circuit breakers are electrically connected in series between a pair of buses and a connecting line for supplying and receiving electric power is led out from between the circuit breakers, is characterized in that new connecting lines for supplying and receiving electric power are led out from the main buses through disconnecting switches to a diameter which is an end portion of the gas-insulated switchgear. A leading out side of the connecting lines is outside the main bus, and an installation area of the gas-insulated switch gear is not increased.

5 Claims, 8 Drawing Sheets

US 6,664,493 B2

GAS-INSULATED SWITCHGEAR

BACKGROUND OF THE INVENTION

This invention relates to a gas-insulated switchgear (GIS) of an 1½ CB system and, more particularly to its connecting line arrangement for supplying or transmitting and receiving electric power.

A conventional construction of an 1½ CB system gas-insulated switchgear is shown in FIGS. 9–11. FIG. 9 is an electric circuit for a transformer station and shows a single line connection diagram for one diameter. FIG. 10 is a plane view of a gas-insulated switchgear which has the electric circuit shown in FIG. 9, and FIG. 11 is a front view of the gas-insulated switchgear in FIG. 10. The gas-insulated switchgear comprises three circuit breakers CB1, CB2 and CB3 between main buses 1 and 2, disconnecting switches DS connected to both sides of each of the circuit breakers, and a current transformer and ground switches each not shown, and electric power is received from and supplied to terminals (bushing, cable head) of connecting lines 5, 6 led out from between the disconnecting switches.

Those conventional gas-insulated switchgears are disclosed in JP A 57-202808, Japanese Utility-model Laid-open Application No. 60-141606, JP A 11-146522, JP A 2000-50436, etc., each of which proposes a compact construction or a construction that maintenance and inspection can be easily performed, of the gas-insulated switchgear.

In the above-mentioned 1½ CB system gas-insulated switchgear, the connecting lines for transmitting and receiving electric power are led out from between the two circuit breakers in view of reliability. Since the circuit breakers each are large in size and high in cost, a volume ratio and a cost ratio occupied by the 1½ CB system gas-insulated switchgear become large. Under such a condition, a system of gas-insulated switchgear is required which is able to increase only the number of connecting lines without increasing the number of circuit breakers.

SUMMARY OF THE INVENTION

An object of the invention is to provide a gas-insulated switchgear which has connecting lines for supplying and receiving electric power, the number of which is increased without increasing the installation number of circuit breakers and the installation area of the gas-insulated switchgear, in view of the problems in the above-mentioned conventional gas-insulated switchgears.

The present invention to attain the above object is resides in a gas-insulated switchgear of an 1½ CB system, in which three circuit breakers are electrically connected in series between a pair of buses and a connecting line for supplying and receiving electric power is led out from between the circuit breakers, and which is characterized in that the gas-insulated switchgear is constructed so that a further connecting line for supplying and receiving electric power is directly led out from the bus through a disconnecting switch.

According to an aspect of the present invention, a leading out point of the above-mentioned further connecting line is the bus in a diameter end portion.

According to another aspect of the present invention, a leading out point of the above-mentioned further connecting line is the bus in a diameter which is an end portion of the gas-insulated switchgear. In this case, the above-mentioned buses each are a three phase package bus having three phase conductors shaped in triangle with an apex at a lateral or horizontal side, and when other conductors are connected vertically to the above-mentioned three phase conductors, they are connected after at least one of vertically overlapped two conductors of the three phase conductors is extended to separate horizontally the three phase conductors from each other.

This construction can be made more compact than in the first aspect because the whole construction of the gas-insulated switchgear provided with a new connecting line does not change, compared with that before provision of the new connecting line.

Further, in the case where the further connecting lines are led out from both of the buses, they are led out in the same directions from the same end portions of the buses.

(Note: A bay is a generic term of one circuit corresponding to one circuit breaker, and three bays incorporated make one diameter. An 1½ CB system is a system in which two circuits are incorporated in one diameter (=3CB bays), that is, it is an (3CB 2=) 1½ CB system.)

DESCRIPTION OF EMBODIMENTS OF THE INVENTION

Figure 1:
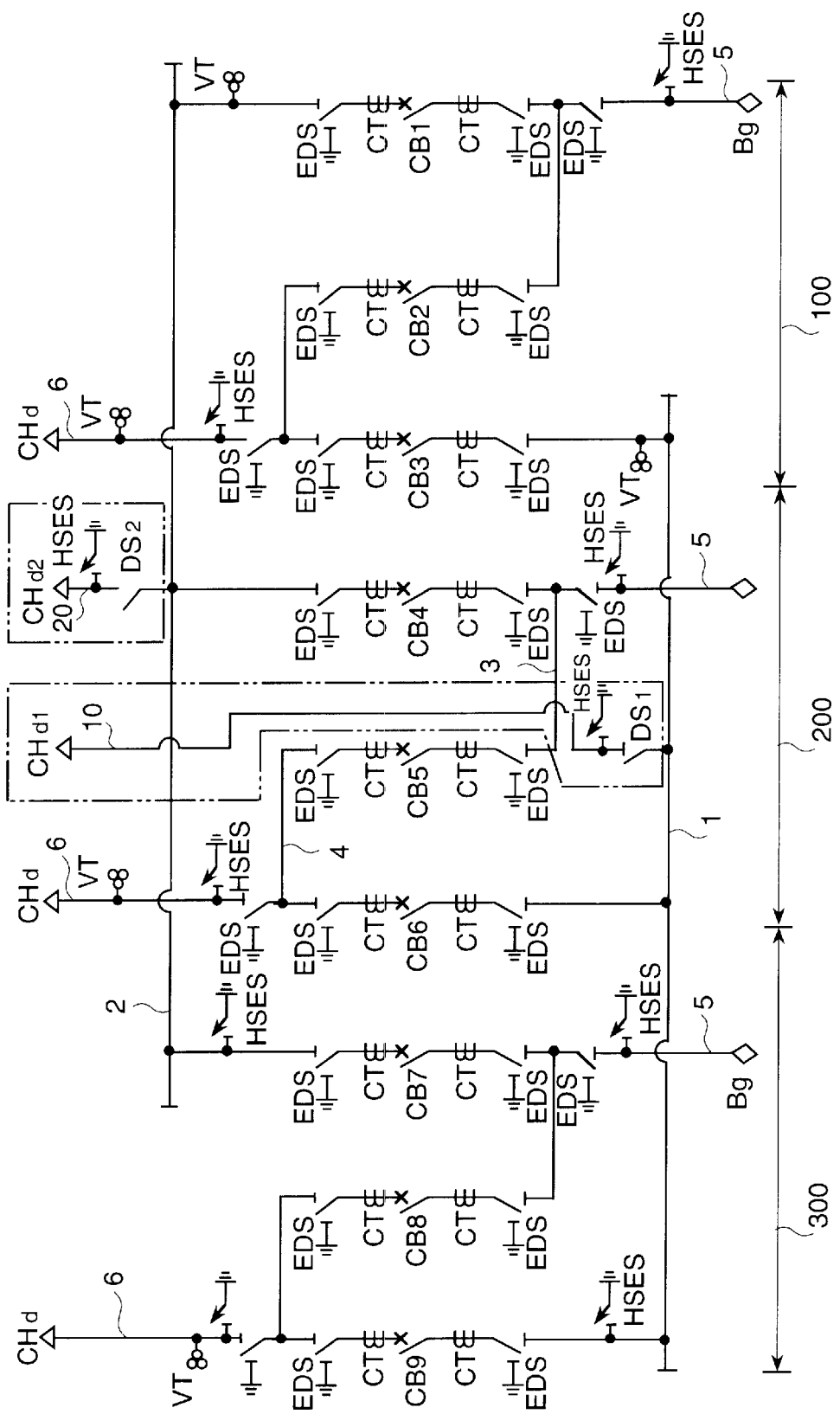
FIG. 1 is a diagram of an electric circuit of a gas-insulated switchgear of a first embodiment of the present invention.

Hereunder, embodiments of the present invention will be described, referring to the drawings.

FIG. 1 is a circuit diagram of a gas-insulated switchgear of a first embodiment of the present invention, and shows a single line circuit diagram which incorporates three diameters between buses 1 and 2. The diameters 100, 200 and 300 are provided with circuit breakers CB1 to CB3 and circuit breakers CB 4 to CB 6 and circuit breakers CB7 to CB9, respectively. In FIG. 1, EDS denotes an earth switch-integrated disconnecting switch, CT denotes a current transformer, VT denotes a voltage transformer, HSES denotes an earth switch (high speed operation type), CHd denotes a cable head and Bg denotes a bushing. The cable head CHd or bushing Bg is provided between the circuit breakers CB in each diameter through connecting lines.

Further, in the present embodiment, new connecting lines shown by enclosing with two-dotted lines are provided. A connecting line 10 is led out from a terminal portion of the bus 1 in the diameter 200 through a disconnecting switch DS1 and connected to a cable head CHd1, and a connecting line 20 is led out from a circuit breaker DS2 of the bus 2 and connected to a cable head CHd2. A high speed operative earth switch HSES is additionally provided between a disconnecting switch DS and a cable head CHd.

In the present embodiment, although the new connecting lines are led out from the diameter 200, it is possible to lead out a similar connecting line from another diameter, further to lead out similar connecting lines from a plurality of diameters. That is, it is made possible to lead out a connecting line from a terminal bus in each diameter through only a disconnecting switch DS and to supply and receive electric power.

Since an 1½ CB system gas-insulated switchgear is made so as to lead out a connecting line for supplying and receiving electric power from between circuit breakers, addition of the new connecting line as in the present embodiment provides a person with a fear that he feels uneasy about the reliability on a system accident. However, when the new connecting line is used for an input line from a power station, for instance, it is possible to avoid the uneasiness about a system accident.

Figure 2:
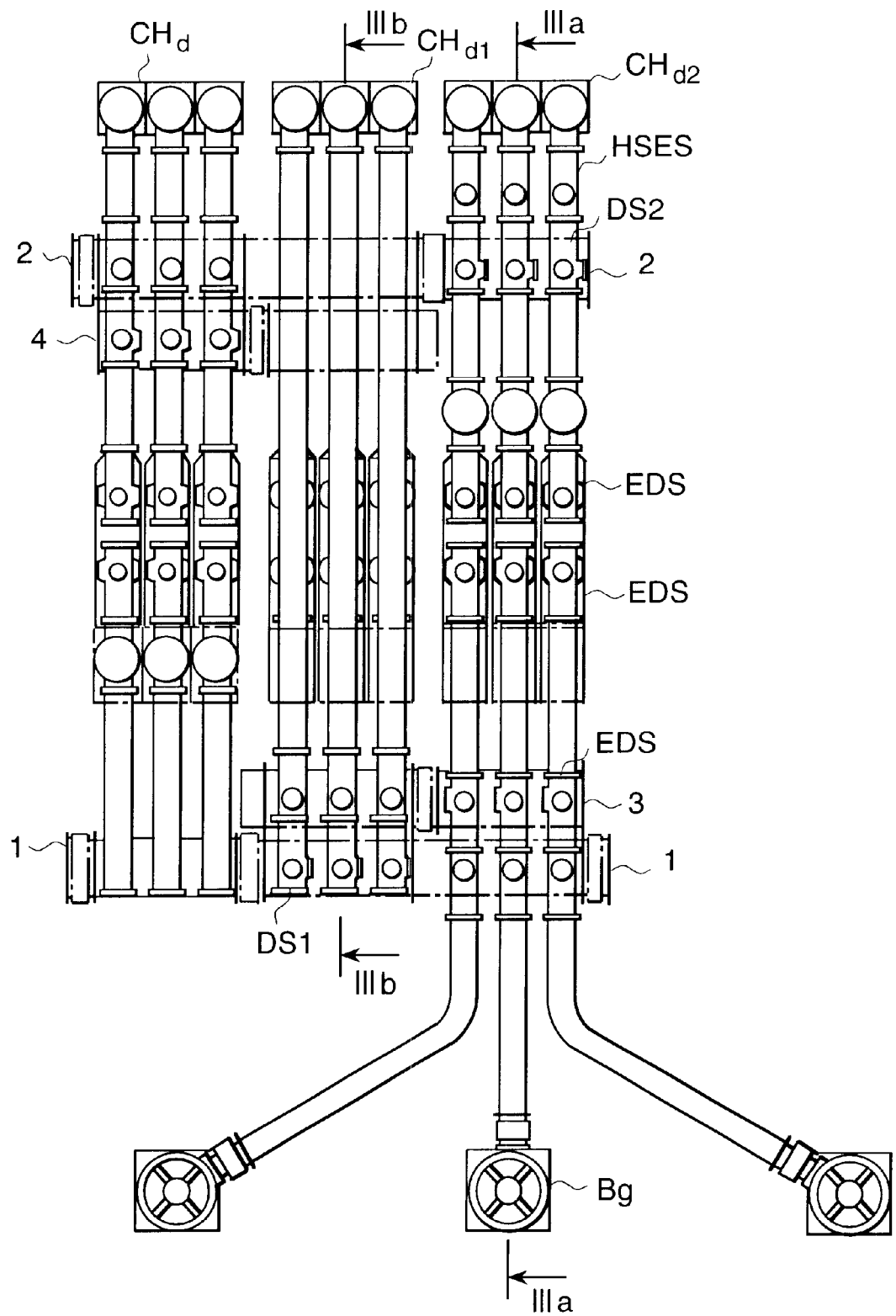
FIG. 2 is a plane view of the gas-insulated switchgear of the first embodiment of the present invention.
Figure 3A:
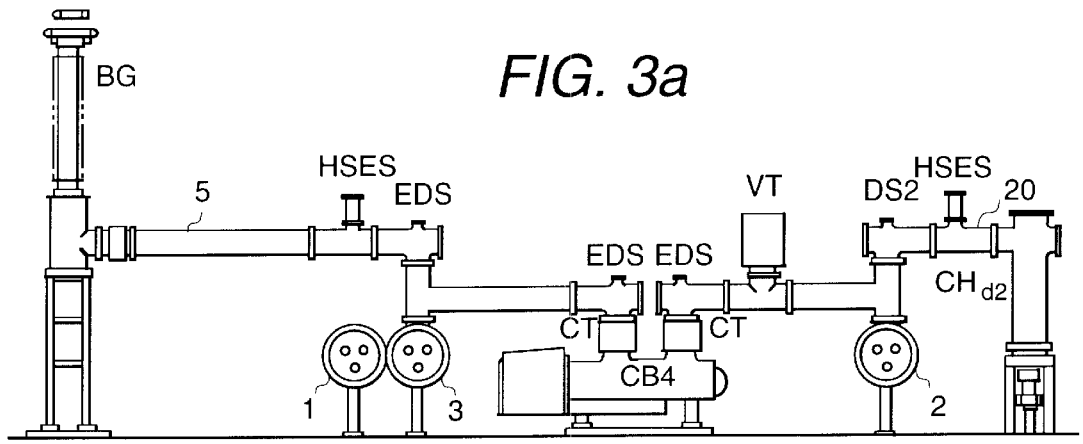
FIG. 3a is a view viewed in the direction of arrows IIIa—IIIa in FIG. 2.
Figure 3B:
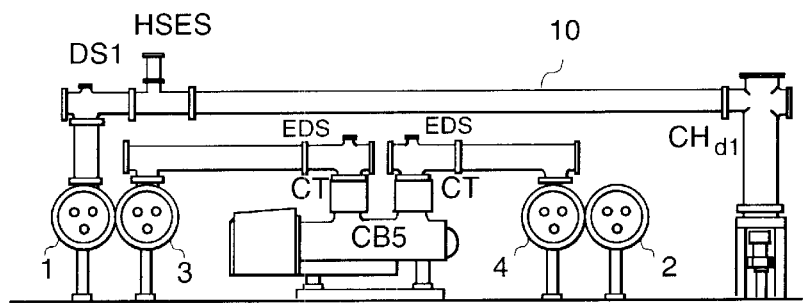
FIG. 3b is a view viewed in the direction of arrows IIIb—IIIb in FIG. 2.

FIG. 2 is a plane view of the diameter 200 of the gas-insulated switchgear of the above-mentioned embodiment, FIG. 3a is a sectional view of FIG. 2 taken along a line IIIa—IIIa and FIG. 3b is a sectional view of FIG. 2 taken along a line IIIb—IIIb. In FIG. 2, respective bays for the circuit breakers CB4, CB5, CB6 are placed side by side and the increased cable heads CHd1, CHd2 are arranged on the side of the bus 2. The buses 1 and 2 are arranged horizontally over three bays for the circuit breakers CB4 to CB6, the bus 4 is arranged in the bays for the circuit breakers CB6, CB5 and the bus 3 is arranged in the bays for the circuit breakers CB5, CB4.

In FIG. 3a, the cable head CHd2 and the disconnecting switch DS2 are arranged in the bay for the circuit breaker CB4, and the sections of buses 2, 3 and 1 are seen there. In FIG. 3b, the cable head CHd1 and the disconnecting switch DS1 are arranged in the bay for the circuit breaker CB5 and the connecting line 10 is arranged therebetween. In FIG. 3b, the sections of buses 1 to 4 are also seen.

The electric circuit, in the case of the present embodiment, is connected from the bus (main bus) 1 to the bus 4 through the circuit breaker CB6, connected to the bus 3 through the circuit breaker CB5 and connected to the bus (main bus) 2 through the circuit breaker CB4. As shown in FIGS. 3a and 3b, three phase conductors of three phase package bus are arranged in a triangle with the apex at a lower side, so that a margin to bend is necessary when a bus is connected horizontally from a vertical bus.

For example, a horizontal bus length is increased when a bus is connected to the bus 2 or bus 3 from the circuit breaker CB4 through the earth switch-integrated disconnecting switch EDS, and a horizontal bus length is increased when a bus is connected to the bus 3 or the bus 4 from the circuit breaker CB5 through the earth switch-integrated disconnecting switch EDS. Further, in the present embodiment, the above-mentioned horizontal bus length is further increased to secure a maintenance space between the three phase package bus and the circuit breaker CB.

Therefore, the width between the bus 1 and the bus 2 of the gas-insulated switchgear increases, whereby the problem that an installation area increases is brought about. In order to solve this problem, a second embodiment will be described hereunder.

In the second embodiment, the three phase package bus in which three phase conductors are arranged in a traingle with its apex at a lateral side is used.

Figure 4:
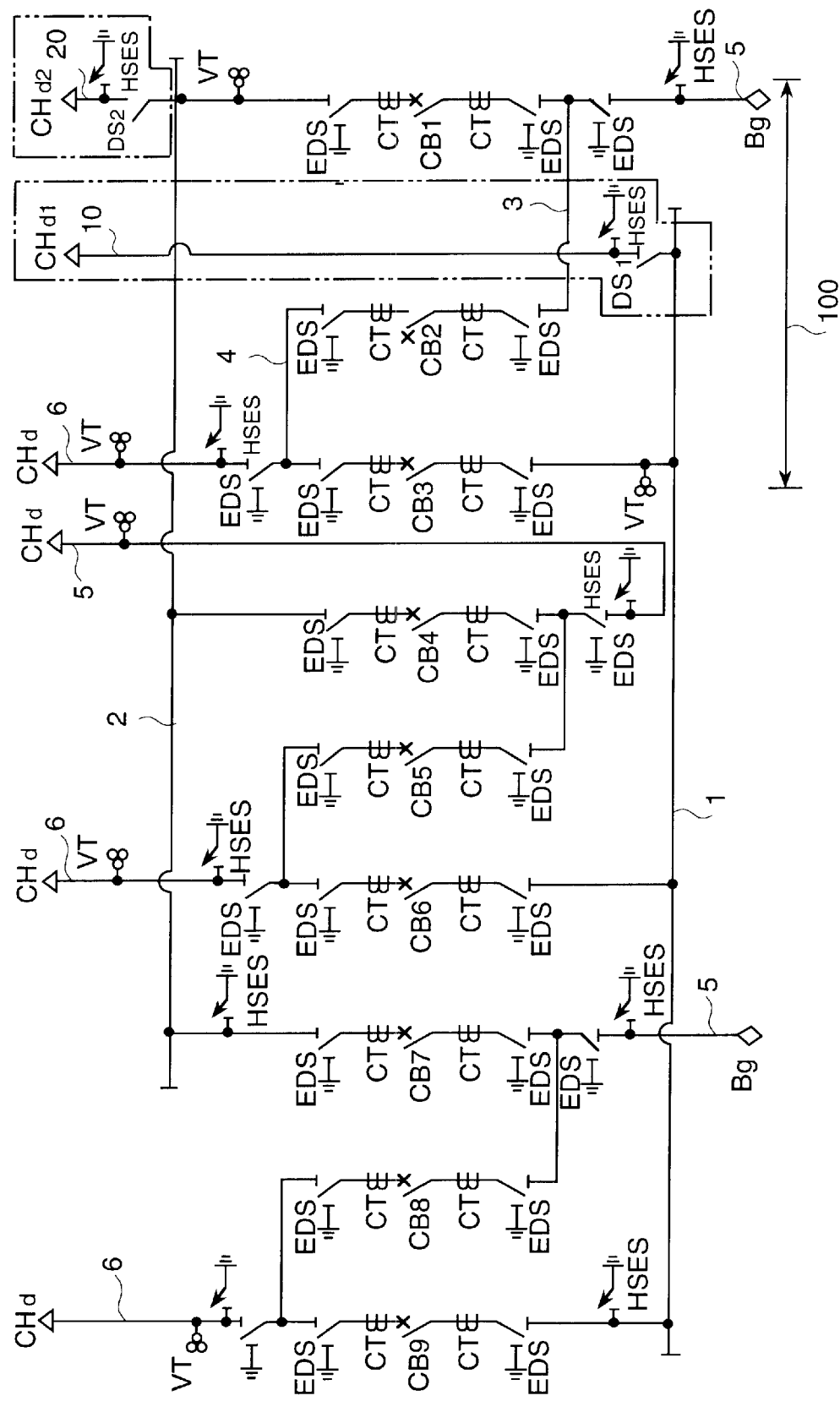
FIG. 4 is a diagram of an electric circuit of a gas-insulated switchgear of a second embodiment of the present invention.

FIG. 4 is an electric circuit diagram of a gas-insulated switchgear of the second embodiment. The circuit is provided with three diameters as in FIG. 1, and arrangement of circuit breakers and connecting lines are the same as in FIG. 1.

In the present embodiment, new connecting lines 10, 20 are led out from the buses at the terminal portions of the gas-insulated switchgear. That is, the connecting line 10 is led out from the end portion of the bus 1 in the diameter 100 through the disconnecting switch DS1 and connected to a cable head CHd1, and the connecting line 20 is led out from the end portion of the bus 2 through a disconnecting switch DS2 and connected to a cable head CHd2.

Figure 5:
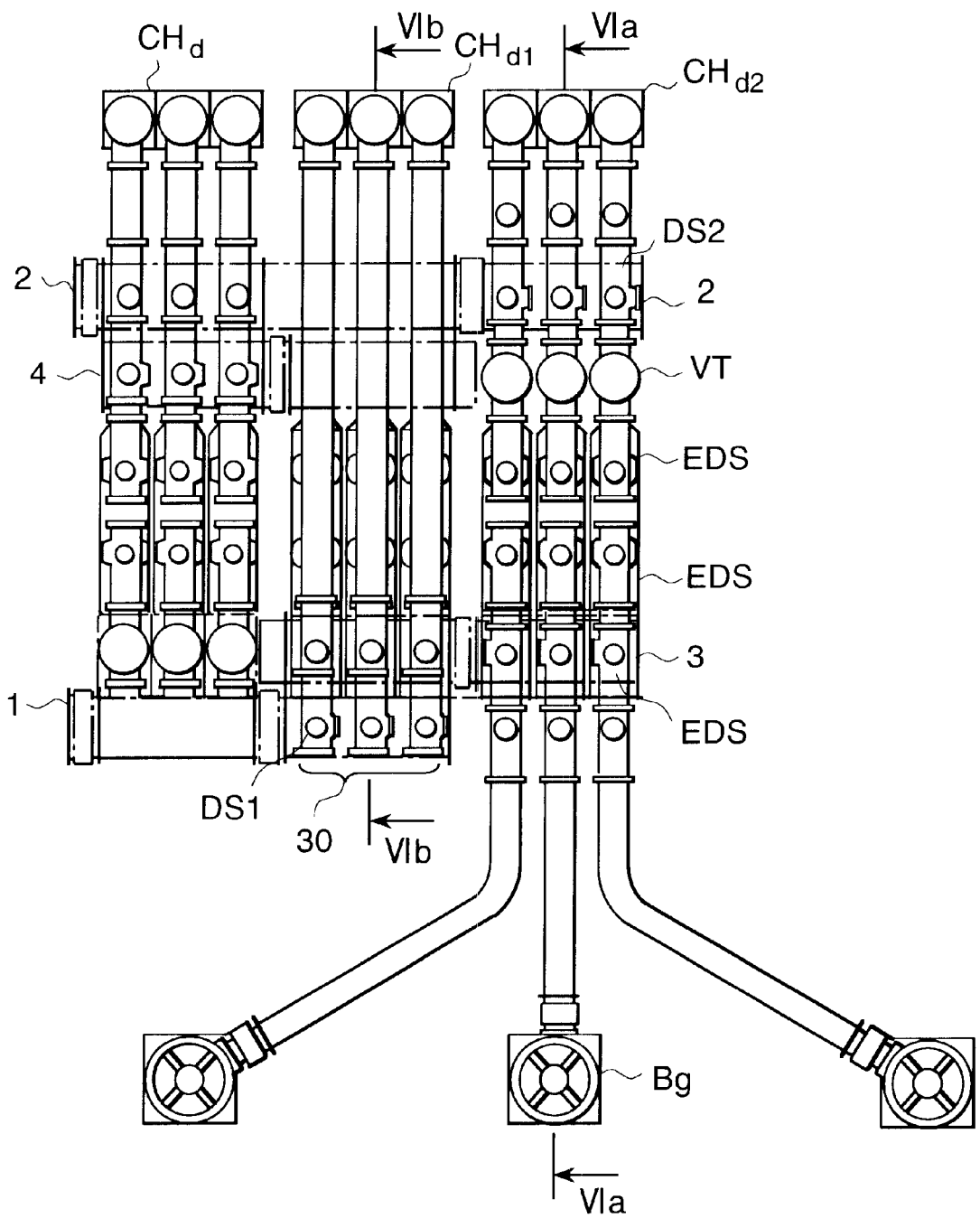
FIG. 5 is a plane view of the gas-insulated switchgear of the second embodiment of the present invention.
Figure 6A:
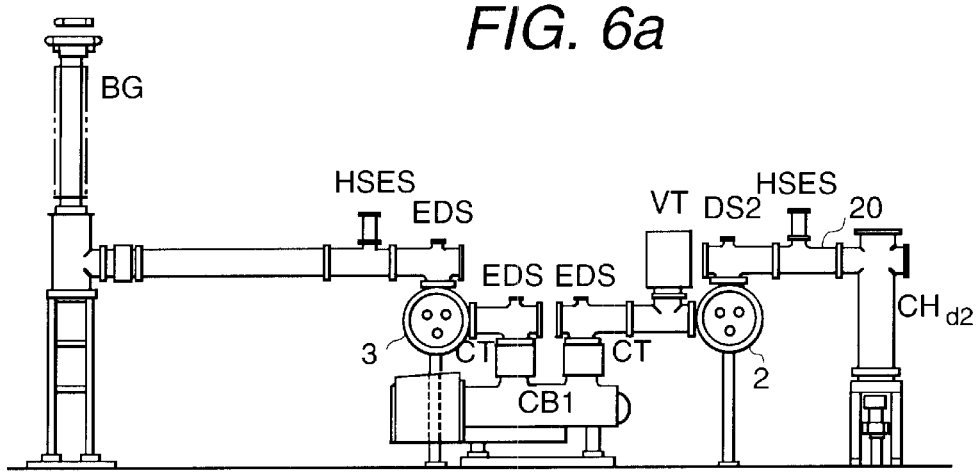
FIG. 6a is a view viewed in the direction of arrows VIa—VIa in FIG. 5.
Figure 6B:
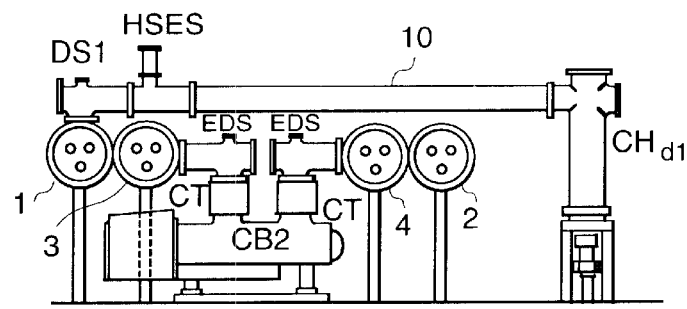
FIG. 6b is a view viewed in the direction of arrows VIb—VIb in FIG. 5.

FIG. 5 is a plane view of the diameter portion 100 of the second embodiment, FIG. 6a is a sectional view of FIG. 5 taken along a line VIa—VIa and FIG. 6b is a sectional view of FIG. 5 taken along a line VIb—VIb. The cable heads CHd1, CHd2 are newly added. A disconnecting switch DS1 is provided on an extended portion 30 that the bus 1 is extended from a bay for circuit breaker CB3 to a bay for circuit breaker CB2 in a conventional switchgear, and the connecting line 10 is arranged from here to the cable head CHd1 on the side of the bus 2. Another connecting line 20 is arranged from the bus 2 in the bay for the circuit breaker CB1 to the cable head CHd2 and the three cable head CHd, CHd1, CHd2 each are arranged outside the bus 2.

Figure 7:
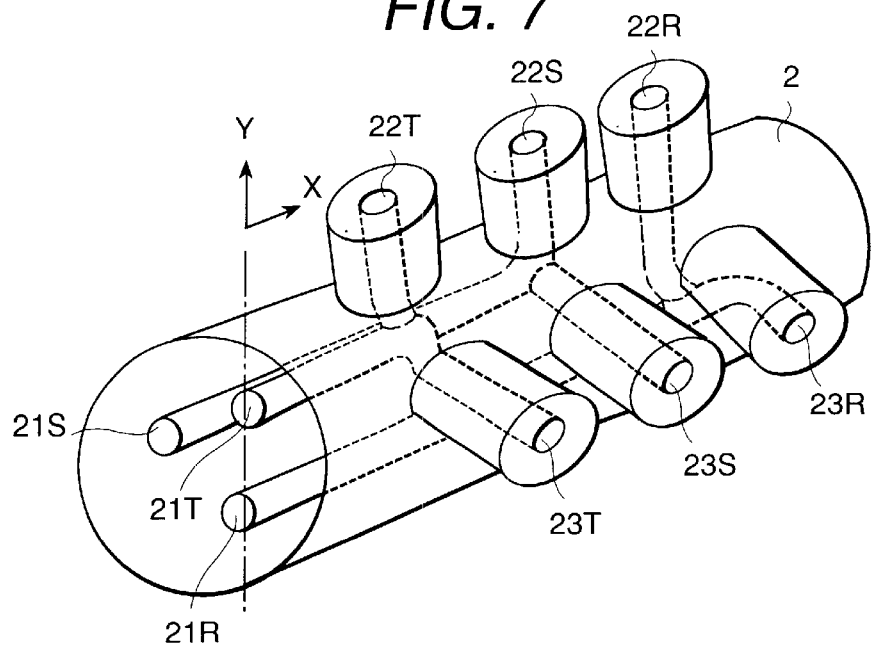
FIG. 7 is a perspective view of a construction of connection in the second embodiment.

FIG. 7 shows an example of a connection structure of bus. In this example, an earth switch-integrated disconnecting switch EDS is horizontally connected to an end portion of the bus 2 in FIG. 6a and a disconnecting switch DS2 is vertically to the end portion of the bus 2. In FIG. 7, the vertical direction and horizontal direction are expressed by y and x, respectively. In the three phase conductors 21S, 21T, 21R of the three phase package bus 2 arranged horizontally to be stretched tightly, the conductor 21S is placed at the apex of a triangle in a lateral or horizontal side, and the conductors 21T, 21R are overlapped in the vertical direction. Three phase conductors 23S, 23T, 23R directed to the earth switch-integrated disconnecting switch EDS and three phase conductors 22S, 22T, 22R to the disconnecting switch DS2 are connected to the three phase conductors 21S, 21T, 21R, respectively. In this case, the three phase conductors 23S, 23T, 23R are possible to be led out horizontally as they are, however, the three phase conductors 22S, 22T, 22R are impossible to be lead out because the conductor 21T and the conductor 21R are overlapped in the vertically direction, therefore, the conductor 21S is extended, and the conductor 21R is extended further form the extended conductor, whereby the three phase conductors 23T, 23S and 23R are led out from the respective end portion thereof.

With this construction, it is possible to provide the cable heads CHd1, CHs2 without changing a distance between the bus 1 and the bus 2, that is, the width from the bus 1 to the cable head which is a plane width of the conventional gas-insulated switchgear, so that the construction has an advantage that new connecting line or lines can be added without increasing the installation area.

Figure 8:
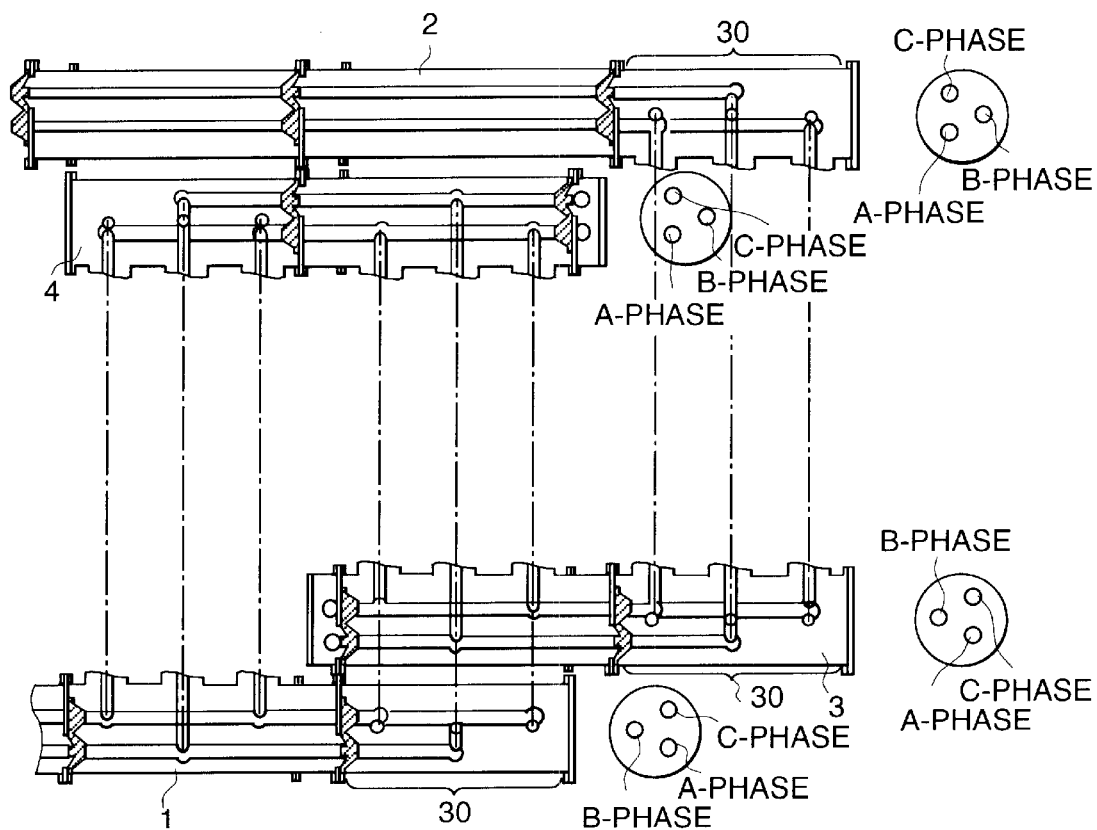
FIG. 8 is a view of an internal construction of a three phase package bus in the second embodiment.
Figure 9:
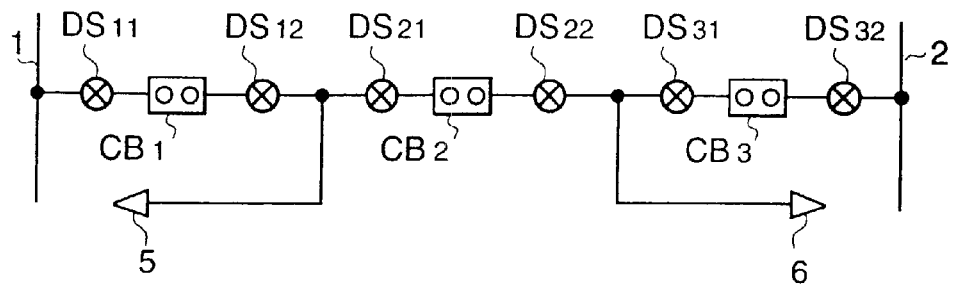
FIG. 9 is a diagram of an electric circuit of a conventional 1½ CB system gas-insulated switchgear.
Figure 10:
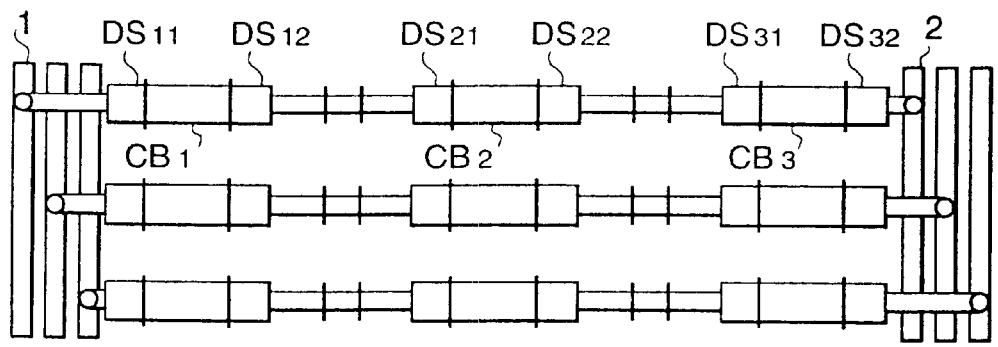
FIG. 10 is a plane view of the conventional gas-insulated switchgear of 1½ CB system.
Figure 11:
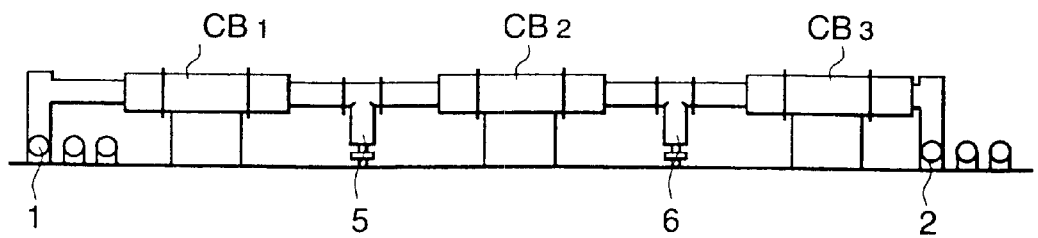
FIG. 11 is a front view of the conventional gas-insulated switchgear of 1½ CB system.

FIG. 8 shows an internal construction of a three phase package bus of the second embodiment. In the ends of each three phase package bus, an A phase conductor and a C phase conductor are overlapped when viewed in the up and down direction in FIG. 8, so that when upside connection is provided for each of the A phase, B phase and C phase conductor, such an extension 30 that the A phase conductor and C phase conductor do not become a bar from each other is provided and the connection is carried out.

Thereby, since the overlapping of the three phase conductors can be avoided, the upside connection to the bus can be easily performed, and an installation area of the gas-insulated switchgear is not increased.

Further, according to the present embodiment, it is possible to increase a connecting line or lines for supplying and receiving electric power by only addition of disconnecting switch DS, so that a cost increase is slight and the present embodiment is suitable for connection of input lines or the like from a power station.

According to the present invention, the 1½ CB system gas-insulated switchgear has an effect to increase the number of connecting lines for supplying and receiving eclectic power. Further, since an installation area of gas-insulated switchgear is not increased, arrangement thereof in a transformer station, etc. becomes easy.

What is claimed is:

1. A gas-insulated switchgear of an 1½ CB system, in which three circuit breakers are electrically connected in series between a pair of three phase package buses and a connecting line for supplying and receiving electric power is led out from between said circuit breakers, wherein said gas-insulated switchgear is constructed so that a further connecting line for supplying and receiving electric power is directly led out from a terminal portion of one of said pair of three phase package buses through a disconnecting switch and connected to a cable head, wherein said further connecting line is independent from said connecting line.

2. The gas-insulated switchgear according to claim 1, wherein said further connecting line is led out from said bus in a diameter end portion.

3. A gas-insulated switchgear of an 1½ CB system, in which three circuit breakers are electrically connected in series between a pair of buses each of which is a three phase package bus and a connecting line for supplying and receiving electric power is led out from between said circuit breakers, wherein said gas-insulated switchgear is constructed so that a further connecting line for supplying and receiving electric power is directly led out from said bus through a disconnecting switch, and a connection of said three phase conductors arranged in triangular shape with an apex at a lateral side of said bus to said disconnecting switch arranged on an upper side thereof is formed so that at least one of vertically overlapped two conductors of said three phase conductors is extended horizontally and connected, wherein said further connecting line is independent from said connecting line.

4. The gas-insulated switchgear according to claim 3, wherein said further connecting line is led out from one or both of said buses in a diameter of an end of said gas-insulated switchgear.

5. The gas-insulated switchgear according to claim 4, wherein said further connecting line is led out from each of said buses towards one side of each bus.

* * * * *